United States Patent [19]

Spaude

[11] Patent Number: 4,825,037
[45] Date of Patent: Apr. 25, 1989

[54] APPARATUS FOR CONTACTLESS DETERMINATION OF A DEVIATION FROM THE DESIRED INTERVAL BY A PULSED SPARK DISCHARGE

[75] Inventor: Heinz W. Spaude, Aichtal, Fed. Rep. of Germany

[73] Assignee: Daimler-Benz Aktiengesellschaft, Stuttgart, Fed. Rep. of Germany

[21] Appl. No.: 170,290

[22] Filed: Mar. 18, 1988

[30] Foreign Application Priority Data

Mar. 18, 1987 [DE] Fed. Rep. of Germany ....... 3708770

[51] Int. Cl.⁴ .............................................. B23K 9/12
[52] U.S. Cl. ............................................... 219/124.34
[58] Field of Search .................. 219/124.34; 324/71.1; 318/576

[56] References Cited

U.S. PATENT DOCUMENTS

| | | | |
|---|---|---|---|
| 4,191,878 | 3/1980 | Check et al. | 219/69 E |
| 4,249,062 | 2/1981 | Hozumi et al. | 219/124.34 |
| 4,507,541 | 3/1985 | Fourre et al. | 219/124.34 |
| 4,531,192 | 7/1985 | Cook | 364/513 |

FOREIGN PATENT DOCUMENTS

| | | |
|---|---|---|
| 0069720 | 7/1982 | European Pat. Off. . |
| 2407065 | 8/1975 | Fed. Rep. of Germany . |
| 2608707 | 9/1977 | Fed. Rep. of Germany . |
| 3151415 | 7/1983 | Fed. Rep. of Germany . |
| 3513799 | 4/1986 | Fed. Rep. of Germany . |
| 0812053 | 8/1955 | United Kingdom . |
| 0800032 | 12/1955 | United Kingdom . |
| 0853661 | 4/1957 | United Kingdom . |
| 1039305 | 2/1964 | United Kingdom . |

OTHER PUBLICATIONS

National Semiconductor Corporation, "Linear Datebook" pp. 7-14 to 7-21, Jun. 6, 1982.

Primary Examiner—Clifford C. Shaw
Attorney, Agent, or Firm—Barnes & Thornburg

[57] ABSTRACT

The deviation of an interval from a desired value is measured using the ratio of spark discharge along one of two discharge paths to the total discharge during a measurement cycle. The two discharge paths are in the same and environmentally symmetrical gas space.

6 Claims, 2 Drawing Sheets

APPARATUS FOR CONTACTLESS DETERMINATION OF A DEVIATION FROM THE DESIRED INTERVAL BY A PULSED SPARK DISCHARGE

BACKGROUND AND SUMMARY OF THE INVENTION

The invention relates to an apparatus for contactless determination of a deviation from a desired interval by pulsed spark discharge along a measurement path compared to a reference path.

A known generic apparatus is shown in German patent specification No. 3,513,799, FIG. 2b, wherein a measurement spark Path is formed between a high voltage electrode and an earth electrode representing the object and a reference spark path is formed between the same high voltage electrode and an earthed reference electrode. The two paths are physically separate from each other. This physical separation leads to poor coupling of these two spark paths, and consequently, to a more or less high switching hysteresis. Because this known apparatus operates metrologically with repetition frequencies in the kHz range, the remaining residual ionization of the activated gas volume cannot be completely neutralized before the next spark discharge. The consequence is a fall in the reaction voltage and hence a shift of the changeover point as a function of the interval, from which the respective other spark path becomes active. This physical separation also results in inadequate compensation of other parameters having an influence on the reaction voltage, such as temperature, pressure, flow, or type of gas. This is particularly the case when used in proximity of welding arcs, which generate intense local gradients of these parameters. Furthermore, the known apparatus operates as an approximation switch and is therefore not suitable for use wherever monitoring of interval tolerances is required.

The object of the present invention is to develop a generic apparatus which reacts largely insensitively to changing environmental influences and further permits a continuous interval resolution at least within a certain tolerance range of a desired interval.

This and other objects are achieved by positioning the electrodes which define the measurement path and the reference path in a common gas space such that they are in environmentally symmetrical gas spaces. The variation of the interval from the desired value is determined as a function of the frequency of the spark discharge occurring in one of the spark paths which is provided with a sensor within each measurement cycle compared to the total number of spark discharge tripped by a high voltage generator during each measurement cycle. A common high voltage electrode forms a measurement path with a grounded electrode representing the object and a reference path with a reference electrode fixed to the high voltage electrode at an interval corresponding to the desired interval. Alternatively, a second high voltage electrode, which is connected electrically in parallel and physically connected with the first high voltage electrode, defines the reference path with the grounded reference electrode. Preferably, the sensor is in circuit with the measurement spark path. A device may be provided to flow a medium into the common gas spaces of the measurement paths to maintain environmental symmetry of the paths.

An evaluation unit used with the electrodes includes a first counter, having input connected to an oscillator of a high voltage generator and an output connected to a decoder and to a second counter. The sensor is connected to one of the inputs of the second counter. The first counter determines the measurement cycle and detects the total number of sparks discharged during the measurement cycle. The second counter registers the frequency of the spark discharge detected by the sensor during the measurement cycle and transfers the frequency to the decoder. The decoder forms the ratio of the frequency to the total sparks and forms a signal corresponding to the deviation of the distance from the desired distance using a stored dependency function of the ratio to the distance deviation.

Other objects, advantages and novel features of the present invention will become apparent from the following detailed description of the invention when considered in conjunction with the accompanying drawings.

DETAILED DESCRIPTION OF THE DRAWINGS

Figure 1:
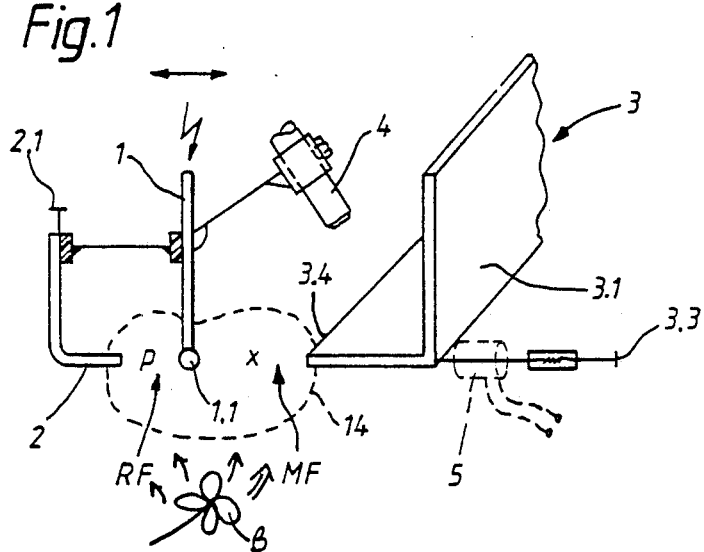
FIG. 1 is a diagrammatic view of a first arrangement of the electrodes according to the present invention.

As can be seen from FIG. 1, the electrode arrangement of the apparatus comprises a high voltage electrode 1, a reference electrode 2 connected to ground 2.1, and a ground electrode 3.1 representing the grounded (3.3) object 3, a workpiece for example. A body 4, for example a welding electrode of a welding set, is required to move at a specific interval along the contour of the object 3 and is connected with mechanical and electrical insulation to the high voltage electrode 1. The reference electrode 2 is arranged on the high voltage electrode 1 at a fixed interval P relative to the foot 1.1 of the high voltage electrode 1. The interval P may correspond to the desired interval between the body 4 and the contour 3.2, or may be associated correspondingly therewith. A reference spark path RF is formed between the two electrodes 1 and 2. A measurement spark path MF is formed between the foot 1.1 of the high voltage electrode 1 and the reference edge 3.4 of the ground electrode 3.1 at an interval X. A sensor 5, which is arranged in the circuit between the high voltage electrode and ground 3.3, generates an impulse when a spark discharge occurs along the measurement spark path MP.

If a high voltage pulse is applied by a high voltage generator 7 (FIG. 3) to the high voltage electrode 1, and there is precise mechanical (interval X=interval P) and Physical symmetry, the probability of the breakthrough or spark occurring on either of the reference spark path RF or the measurement spark path MF is precisely 0.5 in 15 each case. That is, the detection impulse at the sensor 5 that a spark discharge has occurred along the measurement spark path MF occurs only in 50% of all the spark discharges induced. On the other hand, any slight asymmetry, caused by a modification of the interval X, will immediately modify this probability value.

With reference to FIG. 1, this means that, if $X >> P$, the spark discharges occur exclusively along the reference spark path RF and the sensor 5 therefore generates no impulses. If the interval X approaches the interval P, then the probability that individual spark discharges will also occur along the measurement spark path MF increases. The number of discharges increases with diminishing interval X. On the other hand, if $X << P$, then the spark discharges will occur exclusively along the measurement spark path MF and the sensor 5 generates a number of impulses corresponding to the number of the spark discharges induced.

Figure 4:
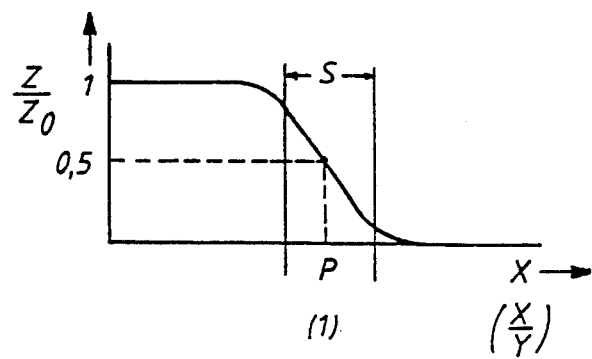
FIG. 4 is a graph of frequency or ratio of detected spark to applied spark versus interval.

On the basis of these circumstances, it is possible to represent the dependence of the percentage of detected pulse to the interval X, namely $Z/Z_o = f(X)$, as shown in FIG. 4, wherein Z denotes the number of spark discharges detected by the sensor within a measurement cycle, and $Z_o$ denotes the total number of spark discharges tripped by the high voltage generator within a measurement cycle. A precise determination of the interval value X is possible in a specific sensitivity range S of the ratio $Z/Z_o$ and the deviation (X-P) can therefore also be determined in terms of the interval P.

Further, as shown in FIG. 1, the physical symmetry of the electrode arrangement is ensured by arranging the reference spark path RF physically closely adjacent to the measurement spark path MF so that they are located in the same gas space. Thus, both the same ionization conditions and extraneous influence conditions exist around both the spark paths. Moreover, the symmetrization of influences by combining the two spark paths in gas volumes as identical as possible, Can be improved further by a synthetic symmetrization. For example, the region of the spark paths can be ventilated by a blower B.

Figure 2:
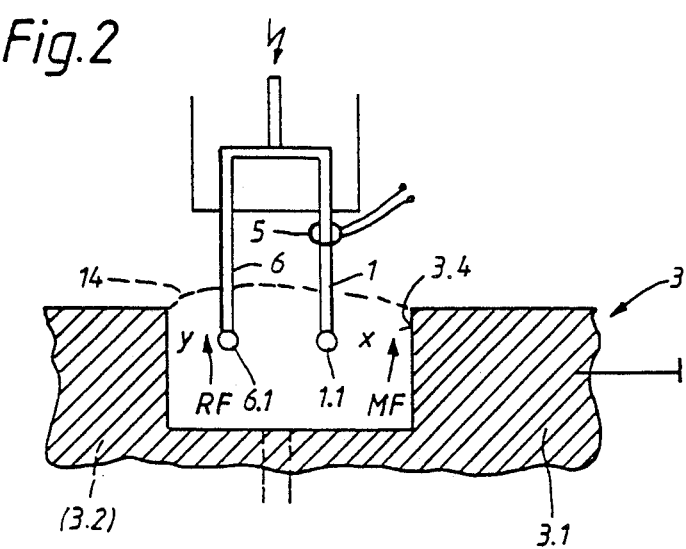
FIG. 2 is a diagrammatic view of a second arrangement of the electrodes according to the present invention.

As shown in FIG. 2, the electrodes of the apparatus are arranged within a workpiece gap, to determine the central position within the workpiece gap, or generally symmetrize the interval of the electrodes relative to one or more object surface. In this embodiment, the measurement spark path MF is formed by a first high voltage electrode 1 and the ground electrode 3.1 representing the objection 3. The reference spark path RF is formed by a second high voltage electrode 6, wired electrically in parallel and combined firmly geometrically with the first high voltage electrode 1, and a reference electrode, which may also be the grounded electrode 3.1,. In the case of a divided workpiece, as indicated by broken lines, the reference electrode may be a reference ground 3.2 formed by the other workpiece section. The feet 1.1 and 6.1 of the two high voltage electrodes 1 and 6 are arranged so that for both the reference spark path and the measurement spark path, they are located in the same gas space. The sensor 5, in this embodiment, forms a direct constituent of the first high voltage electrode 1 so it only generates an impulse when a spark discharge occurs along the measurement spark path.

If a high voltage pulse is applied by a high voltage generator 7 (FIG. 3) to the high voltage electrodes 1, 6, and there is precise mechanical symmetry (interval X=interval Y) and physical symmetry, the probability of breakthrough or spark occurring along either the reference spark path RF or the measurement spark path MF is precisely 0.5 in each case. That is, the detection impulse at the sensor 5 that a spark discharge has occurred along the measurement spark path MF, again occurs only in 50% of all the spark discharges induced. Slight asymmetries, caused by a modification of the interval X, will likewise directly modify this probability value, so an interval dependence of the ratio of $Z/Z_o = f(X/Y)$ can again be represented, as shown in FIG. 4.

Figure 3:
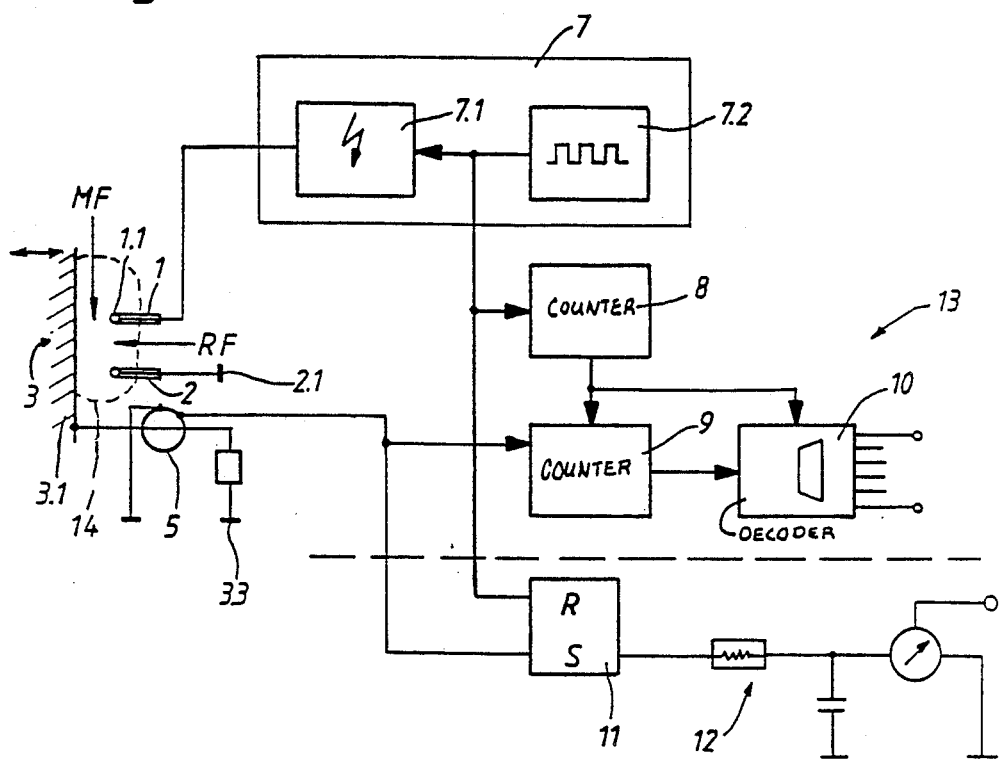
FIG. 3 is a diagrammatic view of the apparatus with evaluator unit according to the present invention.

In FIG. 3, the apparatus with its electrode arrangement and evaluator unit 13 is analogous to FIG. 1, wherein the measurement spark path MF is formed between the foot 1.1 of the high voltage electrode 3.1, the reference spark path RF between the foot 1.1, and the reference electrode 2. The high voltage electrode 1 is connected to a high voltage generator 7, comprising the high voltage source 7.1 and an oscillator 7.2, which generates the high voltage pulse. A counter 8 is connected to the output of the oscillator 7.2. The output of counter 8 is connected both to a further counter 9 and to a decoder 10. The output of the counter 9 is connected to the decoder 10. The sensor 5 is connected between the input of the counter 9 and ground.

If a pulsated spark discharge is induced, then during the measurement cycle determined by the counter 8, whereby the total number $Z_o$ of spark discharges tripped by the generator 7 during the measurement cycle is also determined, the sensor 5 detects the spark discharges occurring between the high voltage electrode 1 and the ground electrode 3.1 along the measurement spark path MF. The impulses generated by the sensor 5 pass to and are added in the counter 9, which is reset by the counter 8 at the start of each measurement cycle. At the end of the measurement cycle, the counter state of counter 9, which corresponds to the frequency Z, is stored and the stored value is fed to the decoder 10, which forms the quotient of Z and $Z_o$. By means of the dependence function according to FIG. 4 stored in the decoder 10, the corresponding interval X of the measurement spark path MF is read out from the decoder 10. A signal corresponding to the deviation (X-P) is formed and appears at the output of the decoder 10, as a digital threshold signal, for example. This deviation signal (X-P) is used for the corresponding follow-up or adjustment of the electrode arrangement and/or of the body to the object.

As illustrated below the broken line in FIG. 3, an analog evaluation may also be obtained by a flip-flop 11. Its reset input is connected to the oscillator 7.2 and its set input is connected to the sensor 5. Due to the extremely short time interval between the leading edge of the voltage impulse of the oscillator and the impulse of the sensor, the flip-flop 11 is approximately switched either on or off for an entire voltage impulse cycle. A suitably dimensioned low pass filter 12, connected to the output of flip flop 11, generates a sufficiently low-harmonic analog signal at a fixed oscillator frequency attributable to the interval X and/or to the deviation (X-P).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Apparatus for the contactless determination of a deviation from the desired interval between a body and the contour of an object movable relative to the body by a pulsed spark discharge tripped by a high voltage generator either along a measurement spark path formed between a high voltage electrode and grounded electrode representing the object, or along a reference spark formed between a high voltage electrode and a reference electrode connected to ground; a sensor in the circuit of a spark path for detecting a spark discharge occurring along this spark path, and generating an impulse in response thereto; and an evaluator unit for evaluating said impulse to form a signal as a function of the interval, wherein:

the reference spark path is arranged physically closely adjacent to and in the gas space of the measurement spark path and the evaluator unit includes a first means for forming the ratio of the frequency $Z$ of the spark discharges occurring in the spark path provided with the sensor within each measurement cycle to the total number $Z_o$ of the spark discharges tripped by the high voltage generator during each measurement cycle and second means for forming the signal which is a function of the deviation from the desired interval from the ratio $Z/Z_o$.

2. Apparatus according to claim 1, wherein the same high voltage electrode is used both for the measurement spark path and for the reference spark path, the reference electrode is fixed relative to the high voltage electrode at an interval corresponding to the desired interval, the sensor is in the circuit of the measurement spark path, and the high voltage electrode for both the reference spark path and the measurement spark path forms a common foot in the same gas space.

3. Apparatus according to claim 1, wherein a first high voltage electrode is used for the measurement spark path, a second high voltage electrode, connected electrically in parallel and geometrically firmly with the first high voltage electrode, is used for the reference spark path, the reference electrode is formed either by the ground or a separate reference ground, feet of the first and second high voltage electrodes are positioned in the reference path and measurement spark path in the same gas space, and the sensor forms a direct constituent of the first high voltage electrode.

4. Apparatus according to claim 1, wherein the high voltage electrodes are connected to the body in a mechanically and electrically insulated manner.

5. Apparatus according to claim 1, including means for flowing a medium into the gas space of the measurement and spark paths.

6. Apparatus according to claim 1, wherein said evaluator unit includes a first counter, the input of which is connected to an oscillator of the high voltage generator, and its output both to a decoder and to a second counter, the sensor is connected to an input of said second counter, the first counter determines the measurement cycle and detects the total number $Z_o$ of spark discharges during this measurement cycle, the second counter registers the frequency $Z$ of the spark discharges detected by the sensor during the measurement cycle and transfers the frequency to the decoder, the decoder forms the ratio $Z/Z_o$ and forms a signal corresponding to the interval deviation using a stored dependence function of the ratio $Z/Z_o$ to interval deviation.

* * * * *